United States Patent
Mayer

[15] 3,665,947
[45] May 30, 1972

[54] FLUIDIC SENSING CIRCUIT AND PRESSURE REGULATOR

[72] Inventor: Endre A. Mayer, Birmingham, Mich.
[73] Assignee: The Bendix Corporation
[22] Filed: Jan. 5, 1970
[21] Appl. No.: 753

[52] U.S. Cl. ......................................................... 137/81.5
[51] Int. Cl. .............................................................. F15c 1/00
[58] Field of Search ........................... 73/37.5, 357; 137/81.5

[56] References Cited

UNITED STATES PATENTS

| | | | |
|---|---|---|---|
| 2,549,622 | 4/1951 | Moore, Jr. et al. | 73/357 |
| 2,697,554 | 12/1954 | Kendig | 73/357 X |
| 2,589,251 | 3/1952 | Heinz | 73/37.5 |
| 3,152,612 | 10/1964 | Avery | 137/625.4 |
| 3,314,294 | 4/1967 | Colston | 137/81.5 X |
| 3,340,885 | 9/1967 | Bauer | 137/81.5 |
| 3,410,287 | 11/1968 | Heyden et al. | 137/81.5 X |
| 3,440,291 | 11/1968 | Boothe et al. | 137/81.5 |
| 3,442,278 | 5/1969 | Petersen | 137/81.5 |
| 3,452,770 | 7/1969 | Beduhn | 137/81.5 |
| 3,468,340 | 9/1969 | DiCamillo | 137/81.5 X |
| 3,473,545 | 10/1969 | Boyadjieff | 137/81.5 |
| 3,530,870 | 9/1970 | Hoglund | 137/81.5 |

Primary Examiner—Samuel Scott
Attorney—John R. Benefiel and Plante, Hartz, Smith & Thompson

[57] ABSTRACT

A fluidic pressure regulator for maintaining a system pressure over a range of ambient pressures, which includes a pressure sensing circuit comprised of a bridge network of orifice and laminar flow restrictors providing an output error signal for all pressures except the unique null pressure at which the pressure drop across an orifice restriction and a laminar flow restriction are equal. A downstream orifice is provided which operates in the sonic regime to eliminate the effects of ambient pressure shifts on the null point, while the error signal is used with a flow controller to maintain the system pressure at this null point. In a second version, the effects of temperature on the null point are eliminated by means of a temperature controlled variation of the area of the downstream orifice.

26 Claims, 12 Drawing Figures

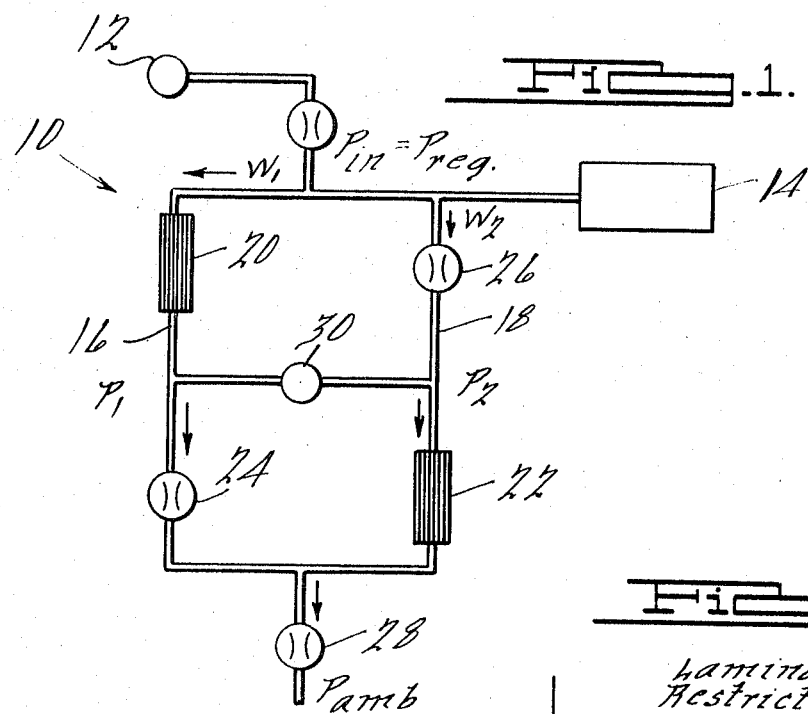
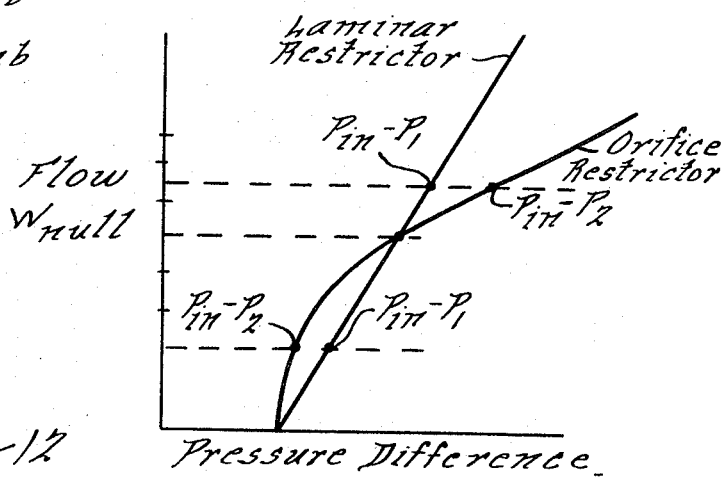
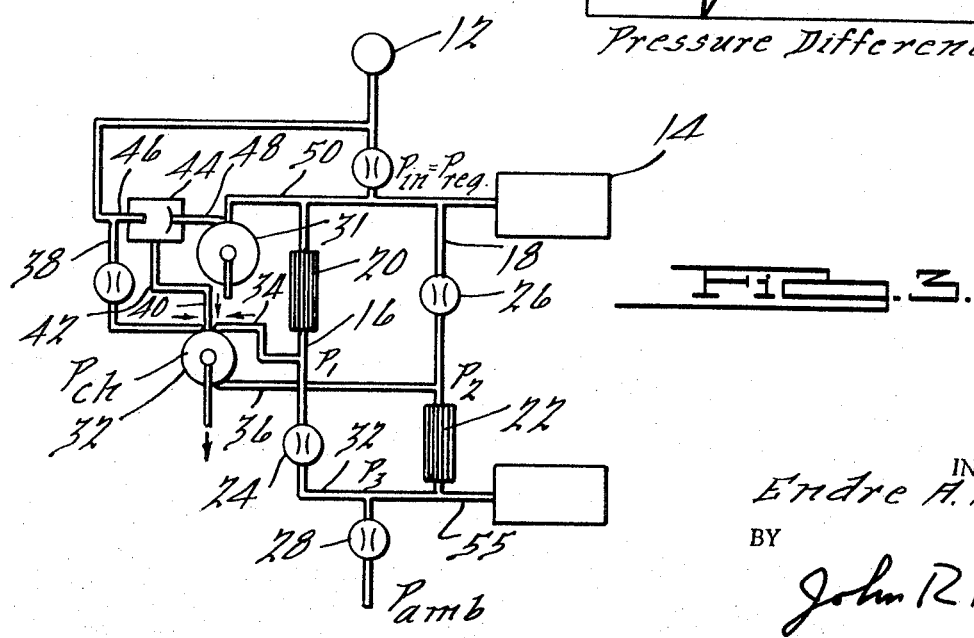

INVENTOR.
Endre A. Mayer
BY
John R. Benefiel
ATTORNEY

INVENTOR.
Endre A. Mayer
BY John R. Benefiel
ATTORNEY

INVENTOR.
Endre A. Mayer
BY
John R. Benefiel
ATTORNEY

FLUIDIC SENSING CIRCUIT AND PRESSURE REGULATOR

BACKGROUND OF THE INVENTION

This invention is concerned with sensing circuits for pressure regulators, and more particularly with sensing circuits for fluidic pressure regulators which are substantially unaffected by ambient pressure and temperature shifts.

The growing field of fluidics has created a need for pressure regulators particularly regulators which will provide a reference pressure over a range of ambient pressure and temperature variations such as occur with changes in altitude.

Prior art devices have relied for the most part on mechanical arrangements such as evacuated bellows, but this approach introduces certain limitations of cost, storability, as well as reliability.

Hence, it is an object of the present invention to provide a fluidic pressure regulator which is substantially unaffected by ambient conditions.

It is another object to provide a pressure sensing circuit which will provide an output signal corresponding to the pressure at a point by fluidic means which is substantially unaffected by ambient conditions.

It is a further object to provide a temperature controlled variable area restriction for use with the pressure sensing circuit.

SUMMARY OF THE INVENTION

These objects and others which will become apparent upon a reading of the following specification and claims are accomplished by providing a pressure sensing circuit to produce an error signal whenever the system pressure varies from the regulated pressure value, with the error signal operating a flow controller so as to correct the system pressure variation. The pressure sensing circuit is a bridge arrangement of orifice and laminar restrictions together with a downstream orifice designed to operate in the sonic regime. The pressure downstream of one of the orifices and one of the laminar restrictions are equal for only a unique system pressure value, and any difference in these is used as the error signal. The effects of downstream pressure variation on this unique pressure value is eliminated by the sonic orifice.

A second version provides compensation for system temperature shifts by varying the area of the downstream orifice as a function of system temperature.

DESCRIPTION OF THE DRAWINGS

FIG. 1 is a schematic representation of the pressure sensing bridge circuit.

FIG. 2 is a graphic representation of the pressure flow characteristics of a laminar and orifice restriction showing the solution for the unique flow value.

FIG. 3 is a schematic representation of a pressure regulating circuit using a bypass flow controller.

DETAILED DESCRIPTION

Figure 4:
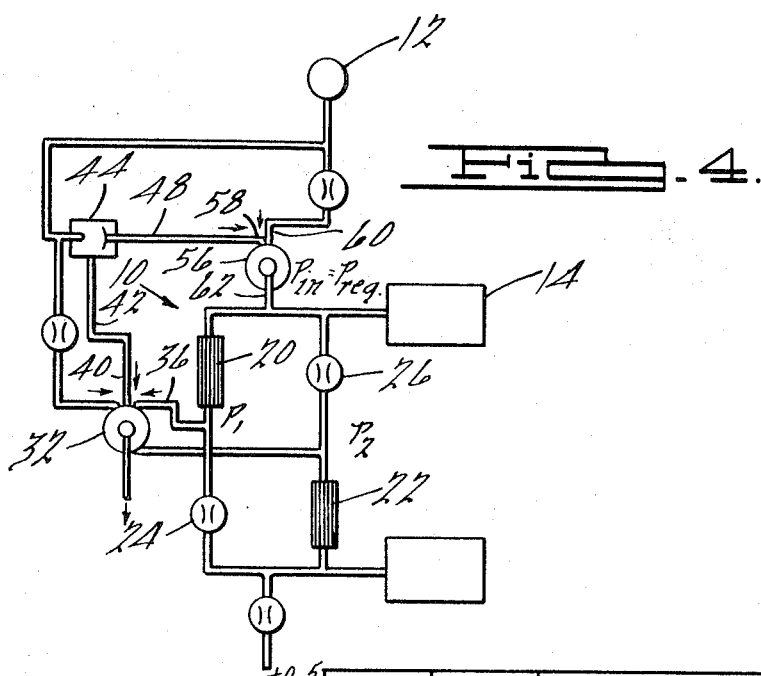
FIG. 4 is a schematic representation of a pressure regulating circuit using an in series flow controller.

In the following detailed description, certain specific terminology will be used for the sake of clarity, and specific embodiments will be described in order to aid in providing a complete understanding of the invention, but it is to be understood that the invention is not so limited and may be practiced in a variety of forms and embodiments.

Referring to the drawings, and particularly to FIG. 1, the pressure sensing circuit 10 is schematically represented. This schematic shows a pressure supply 12 connected in parallel with a system or load 14 to which the regulated pressure is to be applied and with the bridge circuit 10.

The bridge circuit is comprised of a pair of legs 16 and 18, each having a laminar restrictor 20, 22 and an orifice restrictor 24, 26 connected in series. A downstream restriction 28 is connected in series to both of these legs 16, 18.

Connected across the legs 16, 18 intermediate of the flow restriction, is a differential device 30 to subtract the pressure immediately downstream of the laminar restriction 20, $P_1$, and the orifice restriction 26, $P_2$, and provide an output differential pressure.

In the operating range, the mass flow through the orifice restriction $W_2$ is a function of the square root of the pressure difference thereacross, while that through the laminar restriction $W_1$ is proportional to the pressure difference, as indicated graphically in FIG. 2.

By properly designing the downstream restrictions 22, 24, equal flow is obtained in each leg of the bridge circuit 10. Hence, for each value of flow W in each leg created by the pressure difference $P_{in} - P_{AMB}$ there is a corresponding pressure difference $P_{in} - P_1$ and $P_{in} - P_2$ across laminar restriction 20 and orifice restriction 26, respectively. As indicated in FIG. 2, there is a unique value of flow $W_1 = W_2 = W_{null}$ at which the pressure difference will have a common value, $P_{in} - P_1 = P_{in} - P_2$. If the downstream pressure $P_{AMB}$ remains substantially constant, the flow rates vary with the value of $P_{in}$ only, and hence this flow rate $W_{null}$ corresponds to a unique value of $P_{in}$, equal to $P_{reg}$ upstream of the bridge circuit 10. And, since the flow W in each leg is arranged to be substantially equal by the downstream restrictors 22, 24, the pressures $P_1$ and $P_2$ correspond to the pressure difference $P_{in} - P_1$, $P_{in} - P_2$ and these values will vary with $P_{in}$ in the same manner as these differences and as depicted in FIG. 2. From this it follows that there will be a difference in pressure between $P_1$ and $P_2$ for all values of $P_{in}$ except $P_{reg}$ and correspondingly, an output signal from the differential amplifier 30 at all values of $P_{in}$ except $P_{reg}$.

From this it should be appreciated that the first leg 16 generates a signal fluid parameter $P_1$ which is a function of $P_{in}$, while the second leg 18 generates a second signal, fluid parameter $P_2$ which also is a function of $P_{in}$ but this function differs from that of the first leg for all values of $P_{in}$ except at $P_{reg}$.

It should be appreciated that while the downstream pressures have been selected as these signals and is particularly advantageous in this context since the relatively large flows to the differential device can be tolerated, other signals or fluid parameters could be used, such as the pressure drop measued directly across the orifice and laminar flow restriction, or the flow rate therethrough, which would eliminate the need for the downstream restrictions 22, 24.

In order to get a zero output from the differential device 30 at some particular pressure value $P_{in}$, the pressure flow curves of the restrictors, derived analytically or experimentally, may be compared and proper restrictors, selected with pressure flow curves which corss at the desired point corresponding to $P_{reg}$, and which do not cross at any other point in the operating range, so as to render this value unique.

It should be noted that in order to use tubing as the laminar restrictor, the pressure difference between $P_{in}$ and $P_3$ must be made small so that the Reynold's Number $N_r$ is below 2,000.

In a practical design for use with air at room temperatures and providing approximately 32 psia regulated pressure, 0.020 inch ID stainless steel tubing was successfully used for these restrictors, restrictor 20 being made up of a bundle of 19 such tubes 4.62 inches long and restrictor 20 being made up of 12 tubes 4.50 inches long; orifice 26 being $0.2121 \times 10^{-2}$ in $^2$ in area, and orifice 24 being $0.1342 \times 10^{-2}$ in $^2$ in area.

Since the pressure flow curves for the orifice and laminar restrictions 20 and 26 depend on the pressure difference $P_{in} - P_{AMB}$, it follows that the effects of downstream or ambient pressure shifts must be eliminated if the output of the differential device 30 is to be solely a function of the pressure value of $P_{in}$. This is accomplished by operating the downstream restriction 28 in the sonic regime, in which variations in the ambient pressure $P_{AMB}$ will not effect the pressure $P_3$ upstream, hence providing a substantially isolated pressure $P_3$ downstream of the laminar and orifice restrictions 20, 22, 26, 34 which is purely a function of $P_{in}$ in the operating range.

Since this phenomenon is well known in itself, it is not felt necessary to describe it in detail, but suffice it to say that the pressure ratio $P_{AMB}/P_3$ should be established by design to be well below the "critical" pressure value at which flow therethrough will be sonic, so that the restriction will be operating in the sonic regime throughout the operating range of $P_3$ and $P_{AMB}$. An orifice of $0.972 \times 10^{-3}$ in $^2$ in area was used as the restriction in the above described design.

FIGS. 3 and 4 illustrate schematically the incorporation of this sensing bridge 10 into pressure regulating circuits.

The first of these, shown in FIG. 3, is a bypass circuit in which pressure is controllably vented via a flow controller in order to maintain the pressure to the output 14.

This circuit uses a differential pressure amplifier 32 which is connected across the bridge 10 via lines 34, 36. This differential pressure amplifier 32 is a conventional vortex pressure amplifier provided with an initial tangential bias via pressure tap 38, and with the lines 34, 36 connected to opposed tangential ports, so that the pressure values downstream of the restrictions 20, 26 are effectively subtracted and a radial supply 40 then provides a pressure difference signal. A complete description of such a vortex pressure amplifier may be obtained from the "Bendix Journal" Volume 1, No. 4, Winter 1969, Pages 34–37.

In connecting the differential amplifier 32 to the bridge circuit 10, the chamber pressure $P_{CH}$ of the vortex pressure amplifier should be held sufficiently low so that flow into the radial ports when it occurs will be in the sonic regime in order to eliminate the effects of variations in the chamber pressure $P_{CH}$ on the output of the bridge 10 in a manner similar to the bridge vent 28. In the above described design, it was found that the chamber pressure must be held below 20 psia.

The differential pressure output signal is transmitted via line 42 to a confined jet amplifier 44. This type amplifier is particularly suited for this application, wherein the input 46 is connected to a common pressure supply 12, since particularly in combination with a vortex amplifier it characteristically has a high recovery rate, usually in excess of 80 percent. This is important since the output of the confined jet amplifier 44 must be greater than the value of the regulated pressure $P_{in}$ due to the nature of its connection with the flow controller 31, hence establishing a limit on the value of the regulated pressure $P_{in}$.

The confined jet amplifier 44 per se is known in the prior art, and is disclosed in U. S. Pat. No. 3,468,329. Hence, a detailed description is not felt to be necessary.

This device consists of a supply nozzle and an opposing coaxial receiver enclosed in a chamber. The control input 42 is the pressure in the chamber while the control output 48 is the pressure and flow captured in the receiver. A configuration particularly well suited for this application is described in a copending patent application by the present inventor and Donald E. Frericks entitled "Confined Jet Amplifier Having a Receiver Characterized By Having a Plurality of Flow Openings."

This amplifier pressure difference signal is then transmitted to the flow controller 31, which is a vortex valve with output 48 connected to a tangential port, and a line 50 connected to the bridge circuit 10 and the supply port 52 of the vortex valve flow controller 31. Hence, controlled venting that is a function of the "error" signal output of the bridge circuit 10 will provide a constant pressure to the output 14.

The design of the flow controller vortex valve 31 may be successfully accomplished by techniques described in "Large-Signal Vortex Valve Analysis," ASME/HDL Fluidics Symposium, Chicago, May 1967, pp. 233–250, *Advances in Fluidics*.

An alternate pressure output 54 may be obtained at 55, since this pressure will also be maintained by the circuit.

FIG. 4 illustrates a regulator circuit in which an in series flow controller 56 is utilized to maintain the pressure to the output 14. The bridge 10 and amplifier arrangement are similar to that of the bypass regulator of FIG. 3, with the amplified error signal transmitted to a tangential control port 58 of a vortex valve flow controller 56, while the radial supply is connected to the pressure source 12 and the vent 62 is connected to the bridge circuit 10. Thus, flow through the vortex valve controller 56 is controlled by the error signal to increase or decrease the fluid supply to the bridge circuit 10 and output device 14 to maintain the pressure at this point. It should be noted that this pressure $P_{in}$ will be maintained over a range of load flow rates to the device 14.

Figure 5:
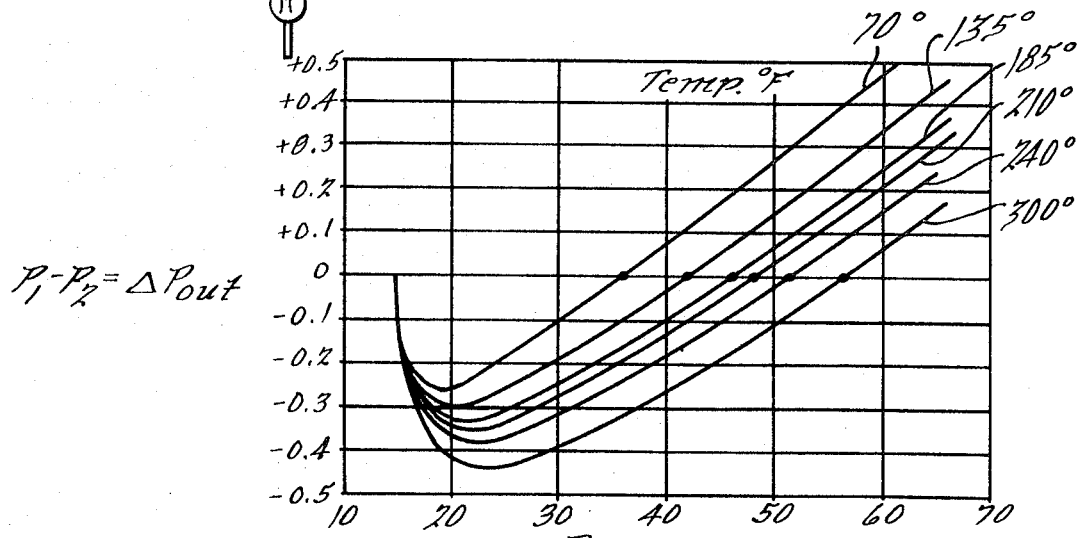
FIG. 5 is a plot of data showing the effect of temperature on the pressure output of the bridge circuit.

The operation of the above systems has been described contingent on the maintenance of a substantially constant temperature. If temperature variations do occur, the flow for a given value of $P_{in}$ will vary accordingly and the effect on the orifice and laminar flow restrictions 26, 20 will differ, and hence a shift in the null point will occur. FIG. 5 shows a graphical plot of test results performed on a bridge circuit of the type described. This shows the value of $P_{in}$ at which zero pressure difference occurs across the bridge to shift considerably with temperature due to this effect. This may be verified analytically or experimentally.

Figure 6:
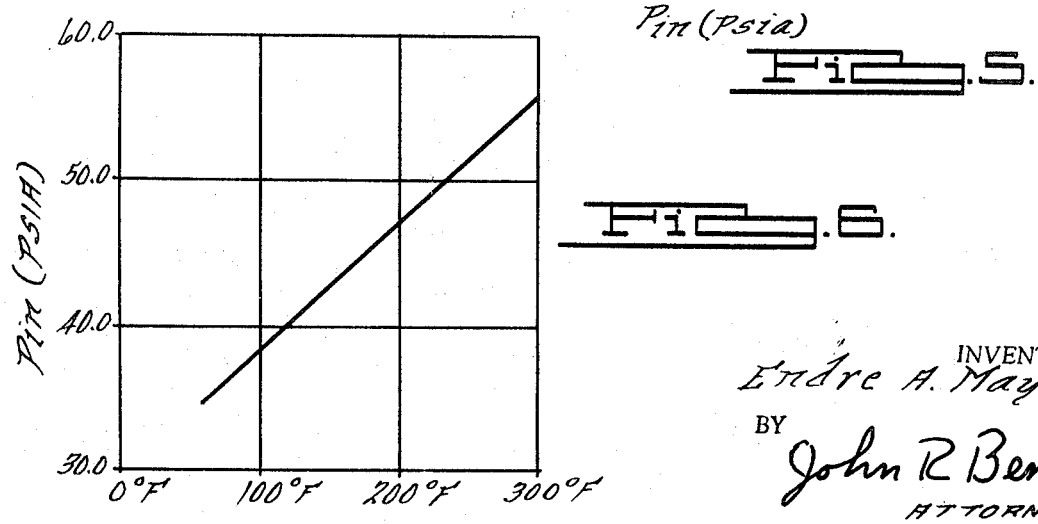
FIG. 6 is a plot of data showing the effect of temperature on the balance pressure of the bridge circuit.

FIG. 6 shows a plot of these values of $P_{in}$ against temperature, and reveals that there is a linear relationship therebetween in the pressure range from 30 psia to approximately 57 psia at temperatures from 70° to 300° F.

Figure 7:
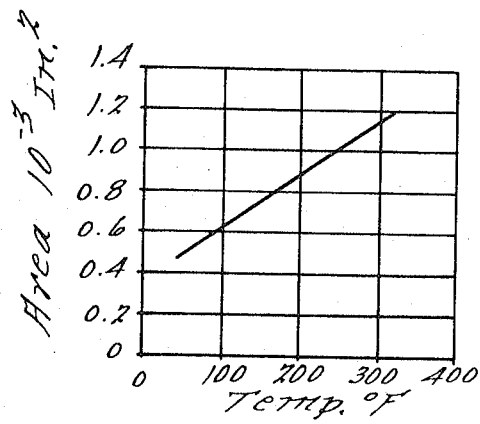
FIG. 7 is a plot of data showing the variation of the area of the downstream orifice required for temperature compensation.

It may be determined analytically or experimentally that this shift of $P_{in}$ may be compensated for by varying the flow for a given value of $P_{in}$ by varying the area of the downstream orifice, and as indicated in FIG. 7, experimental results indicate a straight line variation of orifice area with temperature will compensate for temperature shifts in this operating range. Analysis indicates linearity will occur from approximately 350° to at least 1,500° R.

Figure 8:
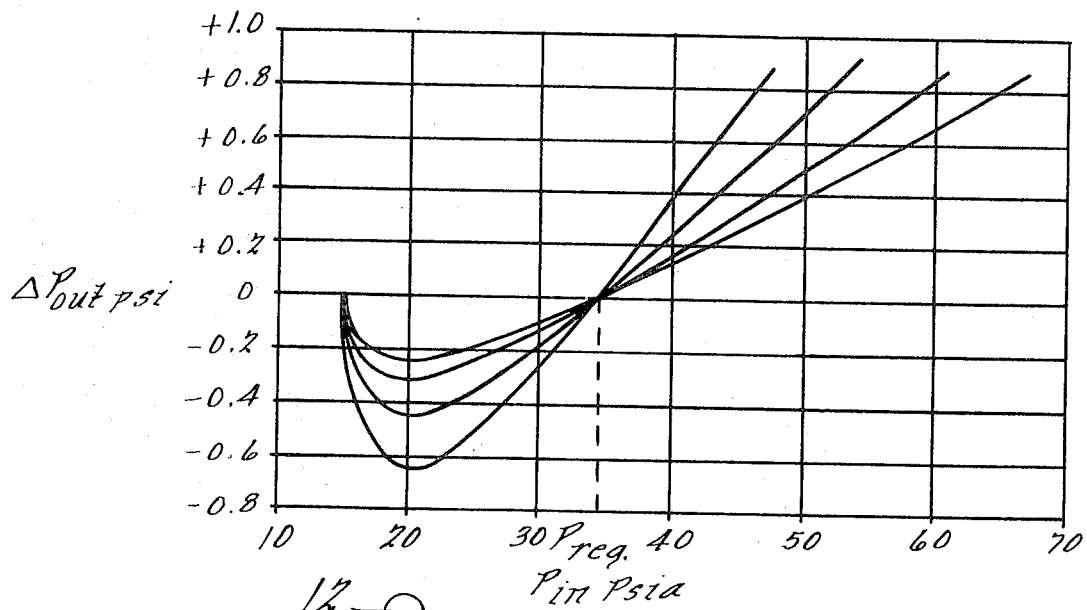
FIG. 8 is a plot of data showing the output of the bridge circuit compensated by a variable area downstream orifice.

FIG. 8 shows the experimental results of the variation of orifice area to compensate for temperature swings, and indicates that the null point $P_{null}$ can be substantially maintained by this approach over the temperature range indicated.

From the above, it can be appreciated that a system for providing a reference pressure over shifts in temperature and ambient pressure could be produced by modifying the circuits of FIGS. 3 or 4 by providing the downstream orifice 28 with some means for varying its area linearly with temperature in this range.

Figure 9:
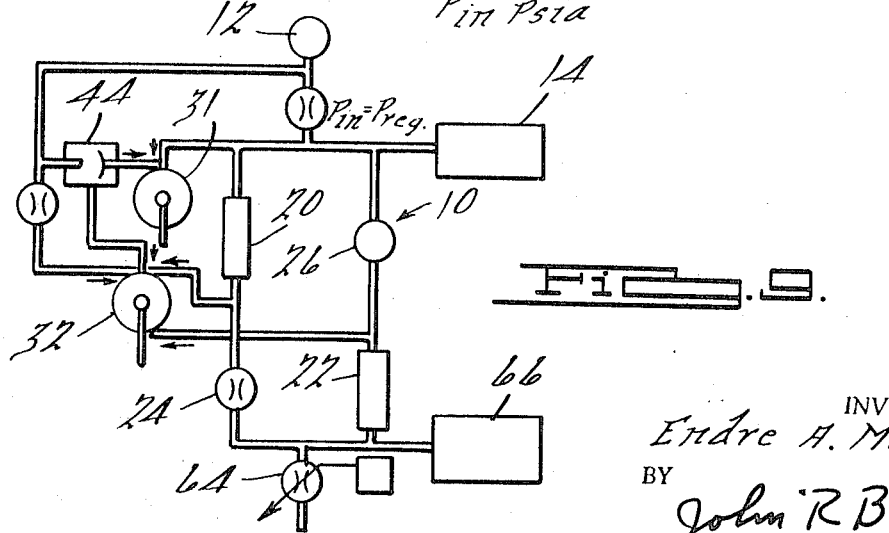
FIG. 9 is a schematic representation of a bypass regulator circuit according to the present invention with a temperature varied area of the downstream orifice.

This is depicted schematically in FIG. 9 wherein a variable orifice 64 is provided together with a control means 66 to vary this orifice area linearly with temperature.

Figure 10:
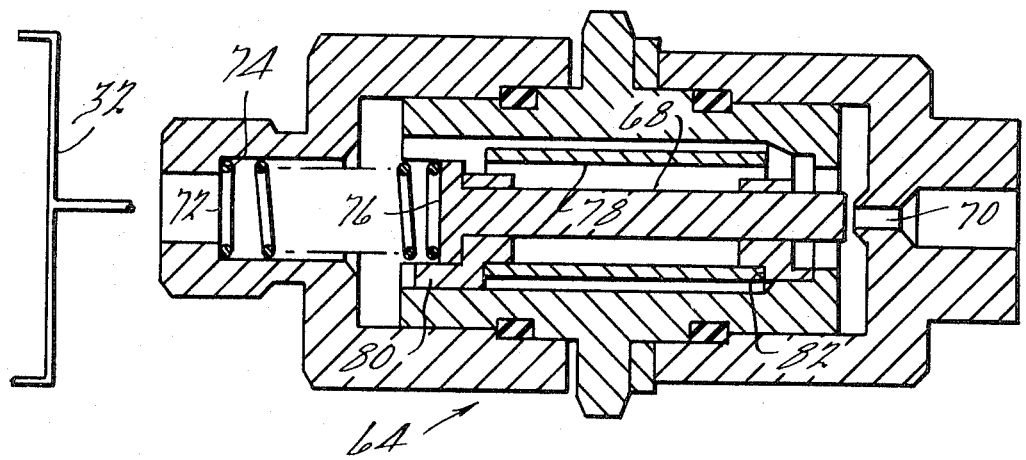
FIG. 10 is a sectional view of a temperature controlled variable area orifice.

FIG. 10 shows such a variable orifice. This arrangement uses a flapper nozzle created by a quartz rod 68 disposed adjacent an exit orifice 70. The quartz rod 68 is positioned by means of a retaining spring 72 which is compressed between shoulder 74 and rod ends 76 so as to bias the quartz rod 68 to the left as viewed in FIG. 10. An aluminum tube 78 cooperates with a follower 80 and an abutment 82 to restrain this movement. Since the quartz rod 68 expands a negligible amount as the temperature increases, the expansion of the aluminum tube 78 causes a corresponding increase in the gap between the quartz rod 68 and the exit orifice 70. By taking the known relationship between a given effective orifice area and a particular exit orifice diameter and gap length, the necessary initial gap and gap changes may be established and together with the relationship between the tube 78 and rod 68 under the influence of temperature changes, the proper lengths, sizes, materials, etc., may be chosen to provide the proper linear variation of the effective orifice area with temperature.

For the design above referred to, a two inch active length aluminum tube with a 0.050 inch exit orifice produced the results shown in FIG. 8.

Figure 11:
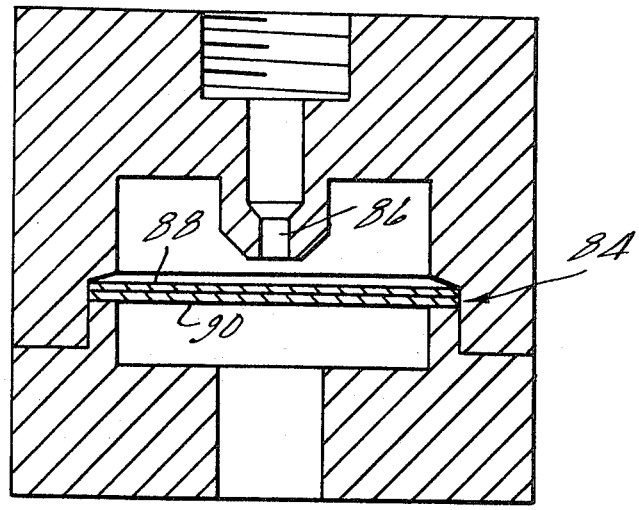
FIG. 11 is a sectional view of a temperature controlled variable area orifice.

FIG. 11 shows a similar flapper nozzle arrangement with a bimetallic element 84 cooperating with an inlet orifice 86 to provide the variable adjustable orifice area. By providing an inner disc 88 and an outer disc 70 of materials having differing coefficients of thermal expansion the gap between the disc 84 and the orifice 86 may be varied with temperature. By proper selections of sizes and materials, the necessary effective area variation can be obtained.

While representative embodiments have been described, a great number of variations thereof are possible within the scope of the invention.

Figure 12:
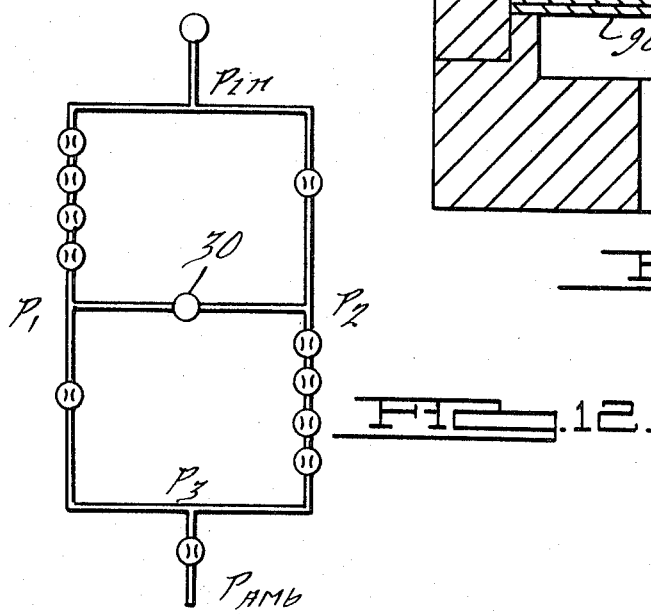
FIG. 12 is a schematic representation of an alternate bridge circuit.

For example, as shown in FIG. 12, other restrictions having differing flow characteristics may be substituted, such as a single and a multiple orifice restriction. Since the pressure flow curve will differ from the multiple and single orifices, a single null point will be provided at the point at which these curves will cross. This arrangement eliminates the effects of temperature variations since all of the restrictions react in the same way to these temperature variations. However, other problems created by this configuration of unsuitable gains and sensitivity to ambient pressures may outweigh this advantage.

In addition, the error signal amplifier arrangement disclosed, while particularly effective in this context, could be modified to use other elements.

The temperature compensation could be carried out by apparatus having a non-linear output if the system was to be used in pressure and/or temperature ranges in which the orifice area necessary to provide compensation did not have a linear relationship therewith.

In this same context, the materials and configurations of the variable orifice device could be selected to produce a non-linear gap length change with temperature.

It should also be noted that the pressure sensing circuit could also be used in other contexts than with a flow controller.

From the above detailed description, it can be appreciated that a low cost, reliable pressure reference has been provided, which is substantially unaffected by shifts in ambient temperature and pressure.

What is claimed is:

1. A pressure sensing circuit for providing an output signal which is an indication of pressure at a location at which pressure shifts occur in a fluid system comprising:
   a variable flow demand load;
   means connecting said location to said variable flow demand load;
   a first fluid flow means in communication with said location producing a pressure drop thereacross which is a function of fluid flow therethrough;
   a second fluid flow means in communication with said location and connected parallel to said first flow means producing a pressure drop thereacross which is a function of fluid flow therethrough with said function differing from the fluid flow function of said first fluid flow means, but having a common pressure drop value at at least one value of flow therethrough;
   means for providing substantially equal varying flows through each of said fluid flow means in response to varying pressure values at said location due to said varying flow rate demands; and
   differential means providing an output signal in response to differences in the pressure downstream of each of said fluid flow means, whereby an output signal is produced for all pressure values except that causing said at least one value of flow.

2. The sensing circuit of claim 1 further including pressure control means providing said equal varying flows independently of pressure values downstream of both of said fluid flow means.

3. The sensing circuit of claim 2 wherein said pressure control means includes a restriction connected in parallel with said fluid flow means downstream from said fluid flow means and further includes means creating sonic flow therethrough through a range of location pressure values including said location pressure value corresponding to said at least one value of flow, whereby variations in pressure downstream from said restriction will not affect the pressure upstream from said restriction in said pressure range.

4. The sensing circuit of claim 1 wherein one of said fluid flow means is an orifice restriction and the other is a laminar flow restriction.

5. The sensing circuit of claim 4 wherein said means for providing substantially equal varying flows includes a second orifice restriction connected in series downstream from said laminar restriction and also includes a second laminar restriction connected in series downstream from said orifice restriction, and wherein said differential means provides an output signal in response to the differences in pressure at the points intermediate said series connected restriction.

6. A pressure regulating circuit for controlling pressure at a location in a fluid system comprising:
   a first fluid flow means in communication with said location producing a pressure drop thereacross which is a function of fluid flow therethrough;
   a second fluid flow means in communication with said location and connected parallel to said first flow means producing a pressure drop thereacross which is a function of fluid flow therethrough, with said function differing from the fluid flow function of said first flow means but having a common pressure drop value at at least one value of flow therethrough;
   means producing a substantially equal varying flow rate through each of said fluid flow means;
   differential means providing an output signal in response to differences in the pressure downstream of each of said fluid flow means;
   flow control means for varying the pressure at said location in response to said signal so as to maintain said location pressure at the value corresponding to said at least one flow value.

7. The regulator of claim 6 further including pressure control means providing said equal varying flows through each of said fluid flow means independently of pressure values downstream of both of said fluid flow means.

8. The regulator of claim 7 wherein said pressure control means includes a restriction connected in series with said first and second fluid flow means downstream from said first and second fluid flow means and further includes means creating sonic flow therethrough through a range of location pressure values including said location pressure value corresponding to said at least one flow value.

9. The regulators of claim 6 wherein one of said fluid flow means is an orifice restriction and the other is a laminar flow restriction.

10. The regulator of claim 9 wherein said means for providing substantially equal varying flow includes a second orifice restriction connected in series downstream from said laminar restriction and also includes a second laminar restriction connected in series downstream from said orifice restriction.

11. The regulator of claim 6 wherein said differential means includes a differential vortex pressure amplifier having a pair of opposed tangential ports connected with one tangential port connected just downstream of one of said fluid flow means and the other opposed tangential port connected just downstream of said other fluid flow means.

12. The regulator of claim 11 wherein said differential amplifier also includes a radial supply port, and wherein said flow control means includes a radial supply port, and wherein said flow control means includes a confined jet amplifier having an entrance and exit port and a control chamber together with means connecting said control chamber with said radial supply port.

13. The regulator of claim 11 wherein said flow control means further includes a vortex valve having a tangential control port, a radial supply port, and an exhaust, and means connecting said exit port of said confined jet amplifier to said tangential control port and means connecting said location with said radial supply port, whereby controlling venting of said location by said output of said confined jet amplifier.

14. The regulator of claim 11 wherein said flow control means further includes a source of fluid pressure and a vortex valve having a tangential control port, a radial supply port, and a central exit port, and means connecting said tangential control port to said exit port of said confined jet amplifier, means connecting said supply port to said source of pressure, and means connecting said exit port to said location, whereby said location is controllably supplied with fluid pressure by the output of said vortex valve.

15. A pressure sensing circuit for providing an output signal which is a function of fluid pressure at a location in a fluid system comprising:
 a first fluid flow device in communication with said location producing a pressure drop thereacross which is a function of the fluid flow therethrough;
 a second fluid flow device in communication with said location and connected in parallel therewith with said first flow means producing a pressure drop which is a function of fluid flow therethrough which differs from the function of the first fluid flow means but having at least one common value of pressure drop at at least one value of flow therethrough;
 means for providing substantially equal varying flows through each of said fluid flow means in response to varying pressure values at said location;
 compensator means varying the flow through each of said fluid flow means in response to said location pressure as a function of system temperature so as to maintain said common pressure drop value at at least one value of flow at a substantially constant value of location pressure for a range of temperature values;
 differential means providing an output signal in response to differences in pressure downstream of each of said fluid flow means, whereby an output signal is produced for all pressure values except that causing said at least one value of flow for all of said temperatures in said range.

16. The sensing circuit of claim 15 wherein one of said fluid flow means is a laminar flow restriction, and wherein the other of said fluid flow means is an orifice restriction.

17. The sensing circuit of claim 15 further including means for controlling fluid flow to or from said location in response to said output signal so as to maintain said location pressure at the value corresponding to said at least one flow value.

18. The circuit of claim 15 wherein said means controlling flow to or from said location includes a source of fluid pressure, and means controlled by said signal controlling the fluid communication between said source and said location.

19. The circuit of claim 15 wherein said means controlling flow to or from said location includes a fluid source in communication with said location and means controllably venting said location in response to said signal.

20. The sensing circuit of claim 15 further including pressure control means providing said equal varying flows independently of pressure values downstream of both of said fluid flow means.

21. The sensing circuit of claim 20 wherein said pressure control means includes a restriction connected downstream from said first and second fluid flow means, and wherein said compensator means includes means varying the flow through said restriction at a given location pressure as a function of temperature.

22. The sensing circuit of claim 21 wherein said pressure control means includes means creating sonic flow through said restriction through a range of location pressure and temperature values including said temperature range and said flow value at said at least one common pressure drop value.

23. The sensing circuit of claim 22 wherein said compensator means includes means varying the effective flow area of said restriction as a function of temperature.

24. The sensing circuit of claim 23 wherein said means varying the effective flow area varies said effective flow area of said restrictor linearly with temperature.

25. The sensing circuit of claim 23 wherein said compensator means further includes a first member and means positioning said member juxtaposed and spaced from said restriction in the flow path and also includes means moving said member so as to vary said spacing as a function of temperature, whereby the effective flow area of said restriction is varied as a function of temperature.

26. The sensing circuit of claim 25 wherein said moving and positioning means includes a second member drivingly connected to said first member and having a differing coefficient of thermal expansion, and also includes means moving said first member relative said restriction in response to differential expansion of said first and second members.

* * * * *